United States Patent
Roberts

[15] 3,654,707
[45] Apr. 11, 1972

[54] IMAGE POSITIONING MEANS FOR AUDIOVISUAL EDUCATIONAL APPARATUS

[72] Inventor: Richard W. Roberts, Lombard, Ill.
[73] Assignee: Borg-Warner Corporation, Chicago, Ill.
[22] Filed: Apr. 7, 1970
[21] Appl. No.: 26,382

[52] U.S. Cl. .................................................35/9 A, 353/27
[51] Int. Cl. ....................................G09b 7/00, G03b 23/08
[58] Field of Search...................35/8 A, 9 R, 9 A; 353/27, 95

[56] References Cited
UNITED STATES PATENTS 3,483,633   12/1969   Geils et al. ............................35/8 A

*Primary Examiner*—Leonard Forman
*Assistant Examiner*—Steven L. Stephan
*Attorney*—Donald W. Banner, William S. McCurry and John W. Butcher

[57] ABSTRACT

A device for releasably clamping an image support in an audiovisual educational apparatus to hold images carried by the support in a single common plane for visual presentation despite intermittent movement of the image support relative to the apparatus, thereby avoiding the necessity for frequent adjustment of the visual presentation for sharpness. The device is operable to release the image support to permit the intermittent relative movement to be effected freely and rapidly.

6 Claims, 3 Drawing Figures

INVENTOR.
Richard W. Roberts
BY
H. Lawrence Smith
ATTORNEY

INVENTOR.
Richard W. Roberts
BY
H. Lawrence Smith
ATTORNEY

IMAGE POSITIONING MEANS FOR AUDIOVISUAL EDUCATIONAL APPARATUS

SUMMARY AND BACKGROUND OF THE INVENTION

This invention relates generally to an educational or teaching device and more particularly to releasable clamp means for engaging an image support in an audiovisual educational apparatus to position and maintain an image presented at a visual display station in a predetermined spatial relationship with respect to the visual display station.

U.S. Pat. No. 3,483,633, issued Dec. 16, 1969 to A. E. Geils et al. illustrates and describes an audiovisual educational apparatus in which an image support carrying a plurality of visual images is moved relative to a visual display station to present the images individually at the station for visual display, an audio reproduction system for audibly presenting a plurality of messages recorded on an audio record means, each of the messages corresponding to one of the images, the images and messages providing an educational or informative program or lesson, the audible presentation of each of the messages being positively correlated with the visual presentation of the corresponding image, means for responding to the audio and visual information presented, and means actuated by the responding means and coacting with code means carried by the image support for controlling the relative movement between the image support and the visual display station. In order to permit the necessary relative movement between the image support and the visual display station to be effected freely and rapidly, the image support cannot be tightly or snugly contained within the apparatus during such movement and, accordingly, the elements of the apparatus which guide, support and drive the image support must be constructed and arranged in a manner such that firm engagement with the support is precluded.

However, if the image support is loosely contained within the apparatus, the images carried thereby are free to move limited distances into and out of the plane in which the visual presentation is sharpest. Although an adjustable optical element can be provided for adjusting the sharpness of the visual presentation, the need to continually adjust the sharpness or focus of the presentation is annoying to the operator and diverts his attention from the program or lesson being presented.

Accordingly, the present invention permits each image presented at the visual display station to be positioned and maintained in a predetermined spatial relationship with respect to the station and also permits rapid and unobstructed relative movement between the image support and the visual display station.

It is, therefore, a principal object of the invention to provide an improvement in an audiovisual educational apparatus.

It is a further object of the invention to maintain the sharpness of the visual presentation in an audiovisual educational apparatus without the need for frequent adjustment.

It is a further object of the invention to maintain the sharpness of the visual presentation in an audiovisual educational apparatus without the need for frequent adjustment, and without interfering with the relative movement between the apparatus and an image support which carries the images to be visually presented.

Additional objects and advantages will be apparent from the following detailed description in conjunction with the drawings.

DESCRIPTION OF THE PREFERRED EMBODIMENT

Figure 1:
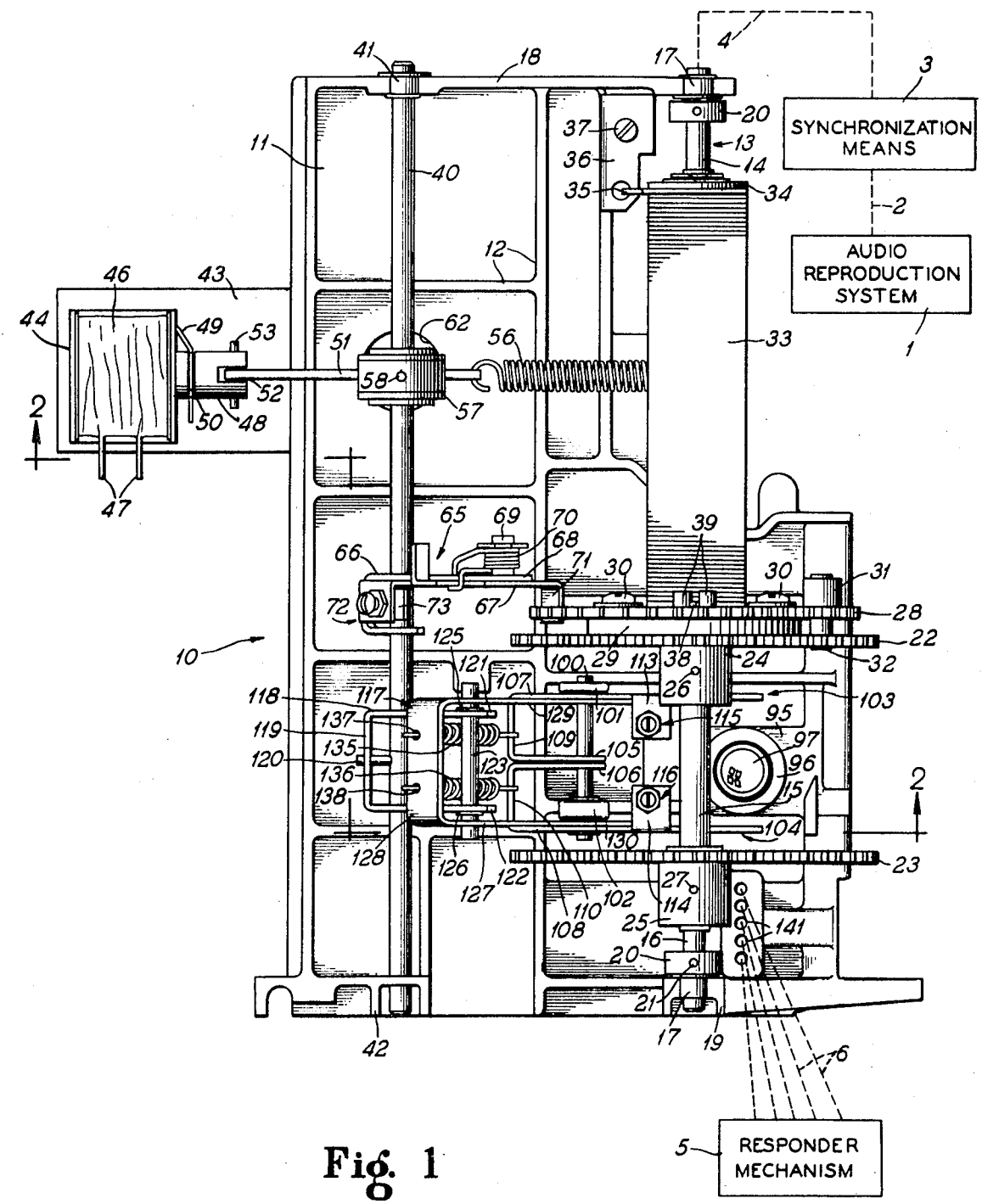
FIG. 1 is a partially schematic representation of an audiovisual educational apparatus and includes a side elevational view of a subassembly of the apparatus in which the improvements provided by the invention are embodied.

Referring to FIG. 1 of the drawings, there is shown an audiovisual educational apparatus or teaching machine which includes an audio reproduction system 1 for audibly presenting a plurality of messages recorded on an audio record means (not shown). The audio reproduction system is coupled by any suitable means 2 to a synchronization means 3 which positively correlates the audible and visual presentation of information, the synchronization means being coupled, in turn, by any suitable means 4 to a subassembly 10 of the teaching machine, as will be explained below with greater particularity. A responder mechanism 5 is provided to permit an operator to respond to audio and visual information presented by the apparatus. Means actuated by the responder mechanism 5 and indicated schematically at 6 act to control the visual presentation of information as explained hereinafter. Examples of an audio reproduction system, a synchronization means and a responder mechanism suitable for the purposes of the present invention are illustrated and described in the aforementioned U.S. Pat. No. 3,483,633. An alternative form of the responder mechanism is shown and described in the co-pending U.S. Pat. application Ser. No. 26,381, filed Apr. 7, 1970 in the name of R. W. Roberts and now U.S. Pat. No. 3,611,587.

The subassembly 10 includes a rigid frame member 11 which is strengthened by a network of upstanding, integral flanges or ribs 12, the frame member 11 being securely mounted in any suitable manner within a housing (not shown) of the teaching machine. A drive shaft, indicated generally at 13, may comprise a number of shaft elements of varying diameters, such as shaft elements 14, 15 and 16. The ends of the shaft 13 are journaled for rotation in suitable bearings 17 provided respectively in an upstanding flange 18 and an upstanding arm 19 of the frame member 11. Stops 20, held in position on the shaft 13 by means of set screws, one of which is shown at 21, are provided for axially aligning the shaft 13. The upper end of the shaft 13 is operatively connected with the synchronization means 3 by the coupling means 4, whereby rotation of the shaft 13 comprises an input to the synchronization means 3.

An upper sprocket wheel 22 and a lower sprocket wheel 23 are carried respectively by mounting bushings 24 and 25 which are fixed to the shaft 13 by pins 26 and 27. A ratchet wheel 28 having a spacer flange 29 is also carried by the shaft 13 and is attached to the upper sprocket wheel 22 by fastening means such as bolts or screws 30. A stop member 31 formed of resilient material is carried by a pin 32 which extends through the ratchet wheel 28 and is secured to the upper sprocket wheel 22, the stop member 31 being provided to coact with an upstanding stop (not shown) on the frame member 11 to limit rotation of the ratchet wheel 28 (and consequently of the upper and lower sprocket wheels 22 and 23 and the shaft 13) to slightly less than 360° in either direction.

A coil spring 33 is compressed between a stop assembly 34, fixed to the shaft 13, and an upper surface of the upper sprocket wheel 28. One end 35 of the spring 33 is secured to a bracket 36 adjustably mounted on the frame member 11 by means such as a bolt or screw 37. The other end 38 of the spring 33 is held by the expansive force of the spring between a pair of abutments 39 provided on the ratchet wheel 28.

An actuator shaft 40 is journaled for pivotal movement at its upper end in a bearing 41 provided in the flange 18 of the frame member 11 and at its lower end in an upstanding arm 42 of the frame member. Attached to the inner side of the frame member 11 by any suitable means and extending from the frame member is a plate member 43 at one end of which is supported a mounting bracket 44 held in place by means such as bolts or screws 45, one of which is visible in FIG. 2. An actuator means in the form of a conventional solenoid 46, having electrical connections 47 and a core extension 48, is secured within the mounting bracket 44 by any suitable means. A spring clip 49 is carried in a groove 50 formed in the core extension 48 and acts to maintain the core extension in position for assembly. A link 51 has one end thereof extending into a slot 52 provided in the outer end of the core extension 48. A pin 53 is secured to the core extension 48 and extends transversely through the slot 52 and through an aperture 54 in the link 51, the aperture being large enough relative to the diameter of the pin 53 to permit relative angular movement between the link 51 and the core extension 48.

The outer end of the link 51 is also provided with an aperture 55 in which is engaged the end of a tension spring 56, the other end of the spring 56 being secured to an upstanding bracket (not shown) provided on an end (also not shown) of the plate member 43 opposite the end on which the solenoid 46 is carried. A bifurcated arm 57 is adjustably positioned on the shaft 40 by means of a set screw 58 and has a pair of legs 59, one of which is visible in FIG. 2 and which straddle the link 51. A pin 60 extends between the legs 59 and through a further aperture 61 in the link 51 of a size to permit relative angular movement between the link and the arm 57. The legs 59 of the arm extend through apertures 62 and 63 provided respectively in the frame member 11 and the plate member 43. A stop member 64, preferably formed of a relatively hard, tough synthetic material, is secured by any suitable means (not shown) to the inner side of the plate member 43 in a position to limit the counter-clockwise movement of the arm 57 as viewed in FIG. 2 and thus establish a rest position for the shaft 40.

The shaft 40 carries a pawl assembly indicated generally at 65 and comprising a U-shaped arm member 66 secured to shaft 40 by means such as a pin (not shown), a pawl member 67 pivotally mounted on an elongated arm 68 of the arm member 66 by a suitable pivot means such as the means 69, and a spring 70 biasing the pawl member 67 in a direction such that a pawl 71 formed on an end of the pawl member 67 is positioned for engagement with the ratchet wheel 28 when the shaft 40 is in its rest position. At the opposite end of the pawl member 67 there is provided a stop assembly 72 which is positioned to co-operate with a stop 73 on the arm member 66 and which is adjustable to vary the angular relationship between the pawl member 67 and the arm member 66 to adjust the orientation of the pawl 71 relative to the ratchet wheel 28.

Figures 2, 3:
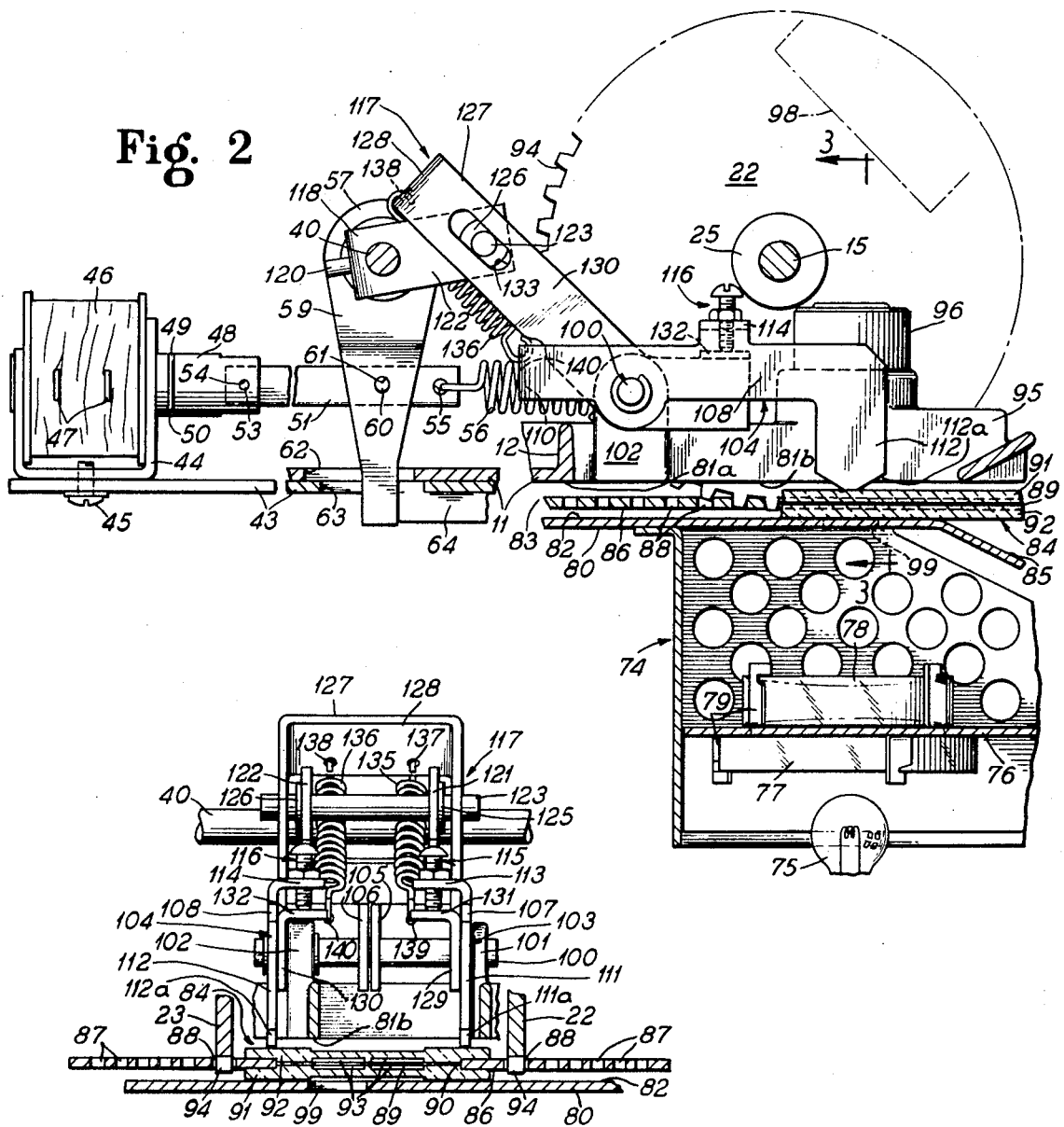
FIG. 2 is an enlarged partial sectional view taken along the plane of line 2—2 of FIG. 1.
FIG. 3 is a partial sectional view taken along the plane of line 3—3 of FIG. 2.

Referring now specifically to FIG. 2, there is shown a portion of a lamp housing indicated generally at 74, a lamp 75 being removably mounted in the lamp housing by any suitable means (not shown) and providing a light source for the visual presentation of information. A partition 76, fixed within the lamp housing 74 by any suitable means such as spot welds, provides a support for a transparent heat shield 77 and an optical element 78, which are secured in position by means such as deformable mounting brackets 79 conveniently formed integrally with the partition 76. An aperture for the passage of light (not shown) is provided in the partition 76 between the heat shield 79 and the optical element 78.

The lamp housing 74 is secured, as by spot welding, to a guide member 80 which is, in turn, secured to the frame member 11 by any suitable means (not shown) which also act to space the guide member from a number of co-planar inner surfaces of the frame member 11 such as the surfaces 81a and 81b. The said inner surfaces and a planar surface 82 of the guide member 80 define an elongated passage or channel 83, a portion of which is shown in FIG. 2, for an image support indicated generally at 84, whereby the said inner surfaces of the frame member 11, the planar surface 82 and the channel 83 defined thereby constitute receiving means for the support 84. The channel 83 is aligned with and is accessible from an aperture (not shown) in the housing of the teaching machine through which the support 84 is inserted by the operator. A cam surface 85 is provided on the guide member 80 to permit the image support 84 to be directed into the channel 83 without difficulty.

The image support 84 may be constructed in any one of a number of different card-like forms, the form represented in FIGS. 2 and 3 being illustrated and described with particularity in the co-pending U.S. Pat. application Ser. No. 797,117, filed Feb. 6, 1969 in the name of W. J. Raymond. Briefly, the image support comprises an elongated base plate 86 having two series of code apertures 87 (FIG. 3), extending therethrough, each series being arranged in a plurality of rows, and two rows of sprocket holes 88 extending therethrough the base plate 86, a film strip 89 positioned within an elongated center opening 90 in the base plate 86 between the rows of sprocket holes, and two transparent supporting strips 91 and 92 which are substantially equal in length to the base plate 86 and which are secured to each other, to the film strip 89, and to the base plate 86 by any suitable means such as pins or rivets (not shown). The image support 84 is thus a generally flat, elongated, rectangular card-like element having its long dimension parallel to the planar surface 82 as shown in FIG. 2. The film strip bears two parallel series of images, each series corresponding to one of the series of code apertures 87, since, in operation, the image support is turned upside down and reinserted after one-half of an educational or teaching program is completed. As shown in FIG. 3, elongated spaces 93 are provided between the two series of images and the supporting strips 91 and 92. Each of the apertures 87 is either a round hole or a slot, in accordance with the code devised for each series of images. The two rows of sprocket holes 88 are spaced from each other a distance equal to the distance separating the sprocket wheels 22 and 23 and the sprocket holes 88 are formed to receive teeth 94 formed on the periphery of each of the sprocket wheels 22 and 23. It should be noted especially that, with the construction best shown in FIG. 3, the film strip 89 is held rigidly between the supporting strips 91 and 92 whereby the images carried by the film strip are constrained to lie in a single common plane.

A hollow optic support 95, formed integrally with the frame member 11, is open at one end and fitted at its other end with an optical mounting 96 in which is fixed an optical element 97 (FIG. 1). The optical mounting 96 is adjustable relative to the optic support 95 for focusing purposes by means which have been omitted from the drawings in the interests of clarity. A mirror 98, forming a part of an optical system of the teaching machine, is shown schematically in FIG. 2. The surface 81b which assists in defining the channel 83, as explained above, is provided on the optic support 95.

A rectangular aperture 99 is formed in and extends through the guide member 80. The intersections of the walls of the aperture 99 and the planar surface 82 define a visual display station with which the images carried by the film strip 89 are individually aligned for visual display.

A fixed shaft 100, mounted in upstanding arms 101 and 102 of the member 11, pivotally carries a pair of clamp members 103 and 104, each clamp member being a mirror image of the other and being adapted to pivot on the shaft 100 independently of the other. Each clamp member has a shorter arm 105, 106 and a longer arm 107, 108 interconnected by a base 109, 110. Each of the longer arms 107 and 108 is provided with a finger 111, 112 at the end thereof opposite the base 109, 110. The fingers 111 and 112 are provided with cam surfaces shown respectively at 111a and 112a. The longer arm 107, 108 is also provided with an inwardly extending tab 113, 114, in which is threaded an adjustable stop assembly, shown herein as a nut and bolt assembly 115, 116.

A clamp release linkage indicated generally at 117 includes a U-shaped arm member 118 having a base 119 fixed to the shaft 40, as by pin 120, for rotation therewith, and a pair of arms 121, 122 through which the shaft 40 passes and which extend radially outwardly beyond the shaft 40. Extending through the arms 121 and 122 is a pin 123 axially held in position by fastening means 125, 126.

The clamp release linkage 117 also includes a U-shaped lever member 127 having a base 128 and a pair of elongated arms 129, 130, lever member 127 being pivotally carried by the shaft 100 which extends through the elongated arms 129, 130, each of the latter having angularly related portions on either side of shaft 100, as is best seen in FIG. 2.

At the end of each elongated arm 129, 130 opposite the base 128 there is provided a stop tab 131, 132 positioned for engagement with the stop assembly 115, 116 carried by the respective clamp member 103, 104. Each of the elongated arms 129, 130 is provided with a slot 133, one of which is visible in FIG. 2, near the base 128 and in which the outer ends of the pin 123 are located. A pair of tension springs 135 and 136 each have one end thereof secured in apertures 137 and 138 provided in the base 128 of the lever member 127. The opposite end of each of the springs 135 and 136 is secured in an aperture 139, 140 formed in the base 109, 110 of the respective clamp member 103, 104.

A series of bearing openings 141, each arranged to be aligned with one of the rows of code apertures 7, is provided in the frame member 11 to slidably support and guide the means 6 actuated by the responder mechanism 5, which means are suitably in the form of elongated rods or pins, as shown and described in the aforementioned U.S. Pat. No. 3,483,633 or co-pending application Ser. No. (Control No. 070294–ES).

Turning now to the operation of the audiovisual educational apparatus or teaching machine illustrated in the drawings, it will be assumed that an audio record means (not shown) has been inserted in the audio reproduction system 1. The image support 84 is now inserted by the operator through the previously mentioned aperture in the housing (not shown) of the teaching machine and into the channel 83. If the leading end of the image support 84 is not precisely aligned with the channel 83, it will be guided thereto by the cam surface 85. As the leading end encounters the fingers 111 and 112 of the clamp members 103 and 104, the cam surfaces 111a and 112a are engaged by the image support 84 to pivot the clamp members 103 and 104 slightly about the shaft 100 in a counter-clockwise direction against the bias of the springs 135 and 136 to permit the image support to continue its passage beyond the fingers 112, the latter remaining in engagement the supporting strip 91. This slight pivotal movement disengages the stop assemblies 115 and 116 and the respective stop tabs 131 and 132.

As the image support 84 proceeds into the passage 83, the teeth 94 on the sprocket wheels 22 and 23 enter the sprocket holes 88. The engagement of the teeth by the image support acts to drive the sprocket wheels, and thus the shaft 13 and the ratchet wheel 28, in a clockwise direction as viewed in FIG. 2, thereby storing energy in the coil spring 33. This continues until the stop member 31 engages the upstanding stop (not shown) on the frame member 11, at which time the image support can be inserted no further into the channel 83, and the teaching machine is conditioned for response by the operator.

More particularly, the rotation of the shaft 15 by the driving action of the image support 84, acting through the coupling means 4, the synchronization means 3 and the coupling means 2, has conditioned the audio reproduction system 1 for audible presentation of the first message. Operation of a suitable audio reproduction system and suitable synchronization means is described with particularity in the aforementioned U.S. Pat. No. 3,483,633.

At the same time, a preliminary image carried by the film strip 89 is aligned with the rectangular aperture 99 formed in the guide member 80. Light from the lamp 75, passing in sequence through the heat shield 77, the aperture (not shown) in the partition 76, the optical element 78, the aperture 99, the supporting strip 92, the film strip 89, the supporting strip 91, and the optical element 97, will be deflected by the mirror 98, whence it is directed to a viewing screen (not shown) for visual presentation of the preliminary image to the operator. At this time, and if necessary, the visual presentation can be adjusted for sharpness by adjusting the optical mounting 96. This may be done by a teacher or instructor if the operator is a child. It is important to note that no further adjustment or focusing of the visual presentation will be necessary since the film strip 84 is rigidly supported in the image support 84 and since the fingers 111 and 112 of the clamp members 103 and 104 are urged by the spring 135 and 136 against the supporting strip 91 to hold the image support in firm abutting relation against the planar surface 82 of the guide member 80, thereby constraining the images carried on the film strip 89 to lie in a single plane. In fact, no focusing adjustment is necessary for any number of subsequent image supports 84 of similar construction inserted in the machine by the operator.

The preliminary image as viewed by the operator will normally provide instructions for his first response. For example, the responder mechanism 5 may include a series of manually operable pushbuttons or response keys (not shown) and the preliminary image may show an arrow pointing to one of the response keys. The operator may now respond by depressing one of the keys, which in turn actuates a corresponding one of the means 6. As previously pointed out, each of the means 6 may comprise an elongated pin or rod, and actuation causes the pin or rod to be slidably advanced in its bearing opening 141 through the corresponding code aperture 87 in the image support 84 and beyond the image support where it engages and closes a micro-switch which is not shown in the drawings but examples of which are illustrated and described in the aforementioned U.S. Pat. No. 3,483,633 and application Ser. No. 26,381. The closing of the micro-switch closes an electrical circuit (also not shown) a portion of which includes the solenoid 46. The solenoid is thus energized, causing the core extension 48 thereof to be drawn to the left as viewed in FIGS. 1 and 2 against the bias of the spring 56. The core extension 48, acting through the pin 53, the link 51, the pin 60 and the bifurcated arm 57, causes the shaft 40 to be pivoted from its rest position through a number of degrees as determined by the limit of movement of the core extension 48 which is, in turn, determined by the construction of the solenoid 46. The pawl assembly 65 carried by the shaft 40 is also pivoted to disengage the pawl 71 from the ratchet wheel 28, thereby releasing the ratchet wheel, the shaft 15 and the sprocket wheels 22 and 23 carried thereby for rotation in a counter-clockwise direction as viewed in FIG. 2 under the urging of the spring 33. However, if the code aperture 87 through which the actuated pin has been extended is a round hole, the pin 6 will hold the image support 84 against movement and thereby preclude rotation of the sprocket wheels 22 and 23 and the shaft 13, a round hole corresponding to an incorrect response. On the other hand, if the aperture 87 entered by the actuated pin 6 is a slot, the image support 84 will be moved by the sprocket wheels 22 ad 23 to the right as viewed in FIG. 2, through a distance corresponding to the length of the slot, and a further image will thus be aligned with the aperture 99 for viewing by the operator. It will be noted that the shaft 13, the sprocket wheels 22 and 23, the ratchet wheel 28, the spring 33 and the pawl assembly 65 comprise means for effecting relative movement between the image support 81 and the visual display station, and that the means 6 control such relative movement.

The audio reproduction system 1 is also connected in the electrical circuit, and when the circuit is closed the audio reproduction system is energized to reproduce audibly the message corresponding to the further image presented to the operator. Rotation of the shaft 13 operates the synchronization means 3 to condition the audio reproduction system 1 for presentation of the next message. If the shaft 13 is held against rotation by the image support 84; that is, if the actuated pin 6 enters a round hole (corresponding to an incorrect response), the synchronization means will not be operated and the last message will be repeated (or, if the operator has responded incorrectly to the preliminary image, no message will be heard). This, combined with the continued visual presentation of the same image, reveals his error to the operator, and he may next choose another response by actuating another response key.

As previously pointed out, the clamp members 103 and 104 are biased in a clockwise direction as viewed in FIG. 2 by the springs 135 and 136, respectively, to hold the fingers 111 and 112 against the supporting strip 91 of the image support 84, thereby holding the image support in firm abutting relation against the planar surface 82 of the guide member 80. In order to permit rapid, unobstructed movement of the image support 84 to align a different image with the aperture 99, the clamp release mechanism 117 is arranged to be actuated simultaneously with the pawl assembly 65.

More particularly, the U-shaped arm member 118 is pivoted with the shaft 40 in a clockwise direction as viewed in FIG. 2 by the action of the solenoid 46. This causes the pin 123, carried by the arms 121 and 122 of the arm member 118, to be moved downwardly and, by virtue of the location of its outer ends in the slots 133, to exert a downwardly directed force on the lever member 127. The latter is thereby pivoted in a counter-clockwise direction as viewed in FIG. 2 about the shaft 100 to move the stop tabs 131 and 132 upwardly. The stop tabs 131 and 132 re-engage the stop assemblies 115 and 116 to pivot the clamp members 103 and 104 in a counter-clockwise direction as viewed in FIG. 2, thereby raising the fingers 111 and 112 out of engagement with the supporting strip 91.

Since both of the U-shaped arm members 66 and 118 are fixed to the shaft 40, actuation of the pawl assembly 65 and the clamp release assembly 117 is simultaneously effected by energization of the solenoid 46.

Suitable switch means, which are not shown but examples of which are illustrated and described in the aforementioned U.S. Pat. No. 3,483,633 and the co-pending application Ser. No. 26,381, are provided to co-operate with the audio reproduction system 1 for opening that portion of the electrical circuit which includes the solenoid 46 within a brief period after the audio reproduction system has been energized. The solenoid 46 is thus de-energized and the shaft 40 is pivoted under the urging of the spring 56 in a counter-clockwise direction as viewed in FIG. 2 to its rest position as established by the engagement of the legs 59 of the arm 57 with the stop 64 (FIG. 2). This causes the pawl assembly 65 to be pivoted to a position in which the pawl 71 re-engages the ratchet wheel 28. Simultaneously, the arm member 118 is pivoted in a counter-clockwise direction as viewed in FIG. 2 to cause the pin 123 to exert a force in an upward direction on the lever member 127, whereby the latter is rotated in a clockwise direction about the shaft 100 and the clamp members 103 and 104 are permitted to return, under the urging of the springs 135 and 136, to the position in which the fingers 111 and 112 once again engage the supporting strip 91 of the image support 84. The images carried by film strip 89 are thus repositioned in a plane which will provide a clear, sharp visual presentation.

The operation heretofore described is repeated until one-half of the program or lesson represented by the film strip 89 is completed, whereupon the image support 84 is removed from the teaching machine, turned upsidedown and re-inserted for completion of the remaining one-half of the program.

As previously noted, the clamp members 103 and 104 are separate from each other and are arranged for independent pivotal movement about the shaft 100, each being subject to the bias of an individual spring 135 or 136. This construction ensures that both of the fingers 111 and 112 will normally be held in engagement with the image support 84 regardless of any surface irregularities in the supporting strip 91 or 92 or misalignment of any of the elements associated with the clamp members 103 and 104.

While this invention has been described in connection with a certain specific embodiment thereof, it is to be understood that this is by way of illustration and not be way of limitation; and the scope of the appended claims should be construed as broadly as the prior art will permit.

What is claimed is:

1. In an audiovisual educational apparatus comprising:
   means defining a visual display station,
   means for receiving a card-like image support having code means and carrying a plurality of visual images,
   means for effecting relative movement between said image support and said visual display station to present said images individually at said station for visual display,
   an audio reproduction system for audibly presenting a plurality of messages recorded on an audio record means, each of said messages corresponding to one of said images,
   synchronization means for positively correlating the audible presentation of each of said messages with the visual presentation of the corresponding image,
   means for responding to audio and visual information presented, and
   means actuated by said responding means and adapted to coact with said code means for controlling the relative movement between said image support and said visual display station;
   the improvement comprising clamp means for engaging said image support to position and maintain an image presented at said visual display station in a predetermined spatial relationship with respect to said station,
   means for releasing said clamp means from positioning engagement with said image support to permit said relative movement between said image support and said visual display station, and actuator means adapted to be energized by said responding means to actuate said means for effecting relative movement, said means for releasing said clamp means being operatively associated with said actuator means for actuation thereby simultaneously with actuation of said means for effecting relative movement.

2. The apparatus according to claim 1, wherein said means for receiving said image support includes a guide member having a planar surface positioned to be engaged by one side of said image support, said means defining said visual display station being provided in said planar surface, said clamp means being positioned to engage the side of said image support opposite said one side thereof, thereby holding said image support against said planar surface in firm abutting relation therewith.

3. The apparatus according to claim 1, including a frame member, said means for receiving said image support including a guide member fixedly mounted on said frame member and having a planar surface positioned to be engaged by one side of said image support, said means defining said visual display station being provided in said planar surface, a first shaft mounted on said frame member, said clamp means comprising at least one elongated clamp member carried intermediate its ends by said first shaft for pivotal movement relative to said guide member, said clamp member having finger means at one end thereof for engaging the side of said image support opposite said one side thereof, thereby to hold said image support against said planar surface in firm abutting relation therewith, a second shaft pivotally mounted on said frame member and parallel to said first shaft, means biasing said second shaft toward a rest position, said means for releasing said clamp means comprising a linkage adapted to be actuated by pivotal movement of said second shaft away from said rest position, said linkage including an arm member fixedly carried by said second shaft for pivotal movement therewith and having at least one arm extending radially outwardly from said second shaft, said linkage also including a lever member carried intermediate its ends by said first shaft for pivotal movement relative to said frame member, said arm being pivotally connected to said lever member proximate to one end thereof, spring means interconnecting said one end of said lever member and the end of said clamp member opposite said finger means to bias said one end of said clamp member toward said guide member for engagement of said image support by said finger means, the other end of said lever member having stop means thereon adapted to engage said clamp member to limit movement of said one end of said clamp member toward said guide member and to pivot said clamp member in a direction to move said finger means away from said guide member upon actuation of said linkage by pivotal movement of said second shaft away from said rest position, actuator means mounted on said frame member, and means operatively connecting said actuator means and said second shaft, said actuator means being adapted to be energized by said responding means to pivot said shaft away from said rest position.

4. The apparatus according to claim 3, wherein said clamp means comprises a pair of said elongated clamp members carried by said first shaft for pivotal movement independently of each other, said finger means comprising a finger at one end of each of said clamp members, said fingers being spaced from each other and being spaced outwardly from opposite ends of said means defining said visual display station, said lever member comprising a first U-shaped member, said one end of said lever member comprising the base of the first U-shaped member, said stop means comprising a stop at the end of each of the legs of the first U-shaped member, said arm member comprising a second U-shaped member, the base of the second U-shaped member being fixed to said second shaft, the legs of the second U-shaped member comprising a pair of said arms, a pin being carried by said arms proximate to the ends thereof, the legs of said first U-shaped member being provided with slots proximate to said one end of said lever member, said pin being slidably positioned in said slots, said spring means comprising a pair of springs, each of said springs interconnecting said one end of said lever member and the end of a respective one of said clamp members opposite said finger.

5. The apparatus according to clamp 3, wherein said means for effecting relative movement between said image support and said visual display station comprises a third shaft mounted for rotational movement on said frame member, sprocket wheel means carried by said third shaft for rotational movement therewith and adapted to engage said image support in driving relation therewith, drive spring means interconnecting said frame member and said sprocket wheel means to urge said sprocket wheel means and said third shaft to rotate in one direction, ratchet means carried by said third shaft for rotational movement therewith, and pawl means mounted on said second shaft for pivotal movement therewith, said pawl means being engageable with said ratchet means to prevent rotation of said sprocket wheel means when said second shaft is in said rest position whereby movement of said pawl means out of engagement with said ratchet means and movement of said finger means away from said guide member are effected simultaneously by energization of said actuator means.

6. The apparatus according to claim 3, wherein said finger means is provided with at least one cam surface for engagement by said image support to move said finger means away from said guide member against the bias of said spring means when said image support is received in said receiving means.

* * * * *